United States Patent
Beyer et al.

(10) Patent No.: US 6,925,864 B2
(45) Date of Patent: Aug. 9, 2005

(54) METHOD OF OPERATING AN INTERNAL COMBUSTION ENGINE

(75) Inventors: Hans-Ernst Beyer, Sachsenheim (DE); Frank Kastner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 41 days.

(21) Appl. No.: 10/754,585

(22) Filed: Jan. 12, 2004

(65) Prior Publication Data

US 2004/0139796 A1 Jul. 22, 2004

(30) Foreign Application Priority Data

Jan. 10, 2003 (DE) ........................................ 103 00 592

(51) Int. Cl.[7] .............................................. G01M 19/00
(52) U.S. Cl. ........................ 73/118.1; 73/40; 73/49.7; 702/51
(58) Field of Search ................................ 73/40, 46, 47, 73/49.7, 116, 118.1, 118.2, 117.2, 117.3; 702/51

(56) References Cited

U.S. PATENT DOCUMENTS

| 4,437,340 | A |   | 3/1984  | Csere et al. |             |
|-----------|---|---|---------|--------------|-------------|
| 4,811,252 | A | * | 3/1989  | Furuse       | 702/51      |
| 4,991,426 | A | * | 2/1991  | Evans        | 73/40.5 A   |
| 5,679,891 | A | * | 10/1997 | Matsuno et al. | 73/118.1  |
| 5,767,398 | A | * | 6/1998  | Naedler      | 73/146.2    |
| 5,939,620 | A | * | 8/1999  | Strand       | 73/49.2     |
| 6,389,882 | B1| * | 5/2002  | Ohkuma       | 73/49.7     |

FOREIGN PATENT DOCUMENTS

| JP | 61226537 | 10/1986 | |
| JP | 63149536 A | * 6/1988 | ............ G01M/3/08 |

* cited by examiner

Primary Examiner—Eric S. McCall
Assistant Examiner—Jermaine Jenkins
(74) Attorney, Agent, or Firm—Walter Ottesen

(57) ABSTRACT

The invention is directed to a method for operating an internal combustion engine including an actuating member in an air supply for adjusting an air mass to be supplied to the engine. In the method, a position of the actuating member is adapted to an instantaneous operating state by a short-time adaptation and a position of the actuating member is adapted by a long-time adaptation to compensate for longer term influences on the position of the actuating member. For a long-time adaptation, a long-time adaptation value is formed for the position of the actuating member in dependence upon a minimum short-time adaptation value for the position of the actuating member which was formed during the short-time adaptation. A leakage in the air supply is diagnosed in dependence upon the long-time adaptation value.

10 Claims, 2 Drawing Sheets

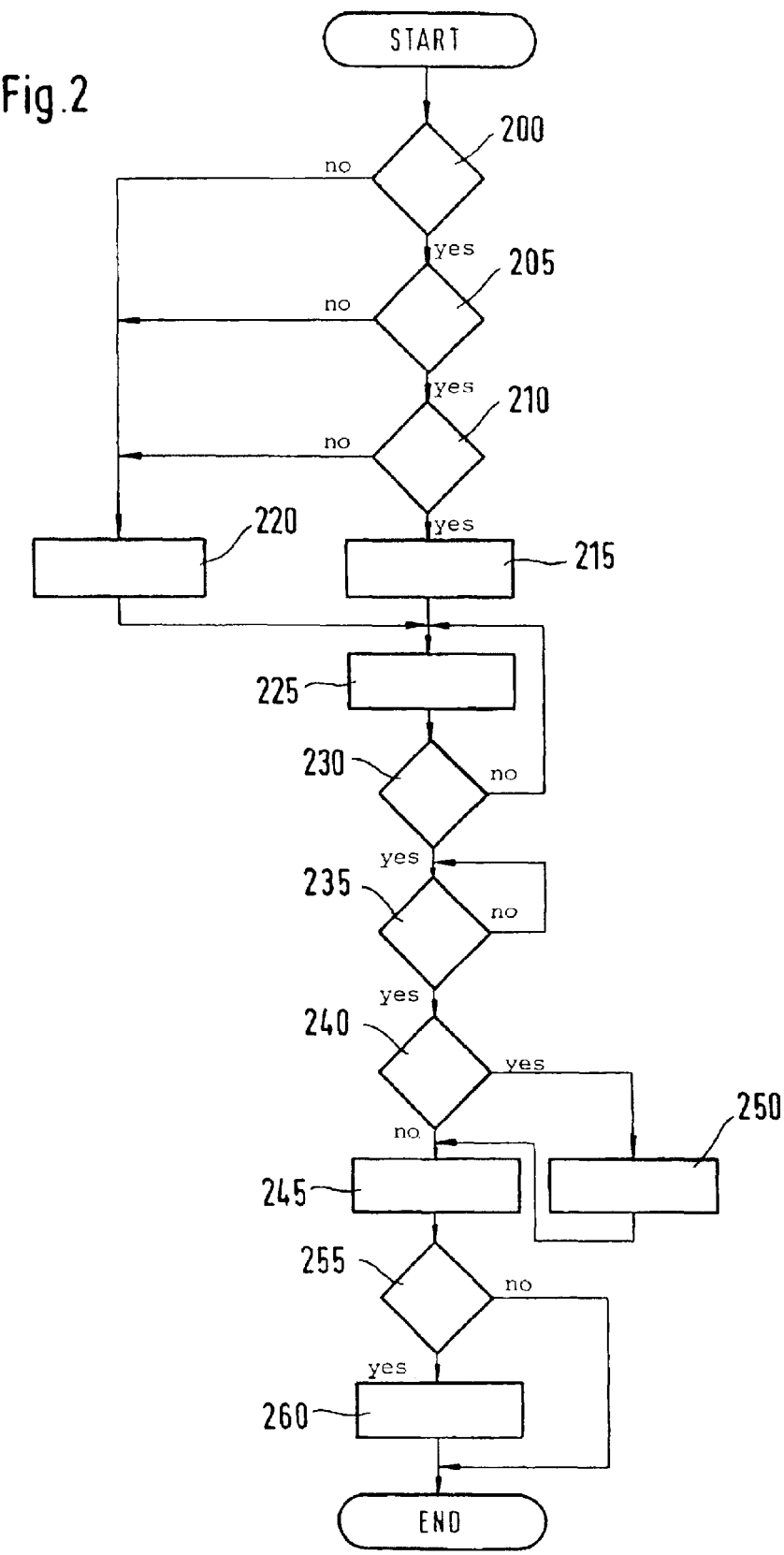

METHOD OF OPERATING AN INTERNAL COMBUSTION ENGINE

CROSS REFERENCE TO RELATED APPLICATION

This application claims priority of German patent application no. 103 00 592.7, filed Jan. 10, 2003, the entire content of which is incorporated herein by reference.

BACKGROUND OF THE INVENTION

It is already known, in an internal combustion engine having an actuating member in the air supply for adjusting an air mass to be supplied to the engine, to adapt a position of the actuating member by means of a short-time adaptation to an instantaneous operating state and to adapt a position of the actuating member by means of a long-time adaptation for compensating longer-term influence quantities on the position of the actuating member. Here, a long-time adaptation value for the position of the actuating member is formed in the long-time adaptation in dependence upon a minimum short adaptation value for the position of the actuating member with this short adaptation value being formed in the short-time adaptation.

SUMMARY OF THE INVENTION

The method of the invention is for operating an internal combustion engine including an actuating member in an air supply for adjusting an air mass to be supplied to the engine. The method includes the steps of: adapting a position of the actuating member to an instantaneous operating state by a short-time adaptation; adapting a position of the actuating member by a long-time adaptation to compensate for longer term influences on the position of the actuating member; for a long-time adaptation, forming a long-time adaptation value for the position of the actuating member in dependence upon a minimum short-time adaptation value for the position of the actuating member which was formed during the short-time adaptation; and, diagnosing a leakage in the air supply in dependence upon the long-time adaptation value.

The method of the invention for operating an internal combustion engine affords the advantage that a leak in the air supply is diagnosed in dependence upon the long-time adaptation value. In this way, such a leak diagnosis can be especially easily realized and without additional sensor means and correspond to the statutory diagnostic regulations.

It is especially advantageous that the leakage is diagnosed when the long-time adaptation value drops below a first pregiven threshold. In this way, a leakage can be diagnosed which adjusts only slowly over time.

A further advantage is that the leakage is diagnosed when a difference between the long-time adaptation value and the minimum short-time adaptation value exceeds a second pregiven threshold. In this way, a leakage can be diagnosed which adjusts in a short time and especially abruptly.

It is further advantageous when the short-time adaptation is only carried out when no brake pumping is present. In this way, a defective adaptation because of brake pumping is avoided and it is ensured that the diagnosis is not falsified by brake pumping.

A further advantage results when the short-time adaptation is carried out only up to a pregiven elevation. In this way, a defective adaptation because of air pressure above a pregiven elevation is prevented and it is ensured that the diagnosis is not made incorrect by such a defective adaptation.

A further advantage results when the diagnosis is only carried out when, after an original start of the engine, at least one long-time adaptation value was already formed. In this way, it is ensured that valid output data are present for the diagnosis.

This advantage results also when the diagnosis is only carried out when the long-time adaptation became valid in an instantaneous operating cycle.

It is especially advantageous when a load of the engine is determined via an intake manifold pressure. In this case, the leakage does not lead to a defective fuel metering so that a leakage in the air supply could not be diagnosed based on the fuel metering. With the method of the invention, a diagnosis of a leakage in the air supply is ensured also for the case that a load of the engine is determined only via an intake manifold pressure.

BRIEF DESCRIPTION OF THE DRAWINGS

The invention will now be described with reference to the drawings wherein:

FIG. 2 is a flowchart showing the sequence of steps for an embodiment of the method of the invention.

DESCRIPTION OF THE PREFERRED EMBODIMENTS OF THE INVENTION

Figure 1:
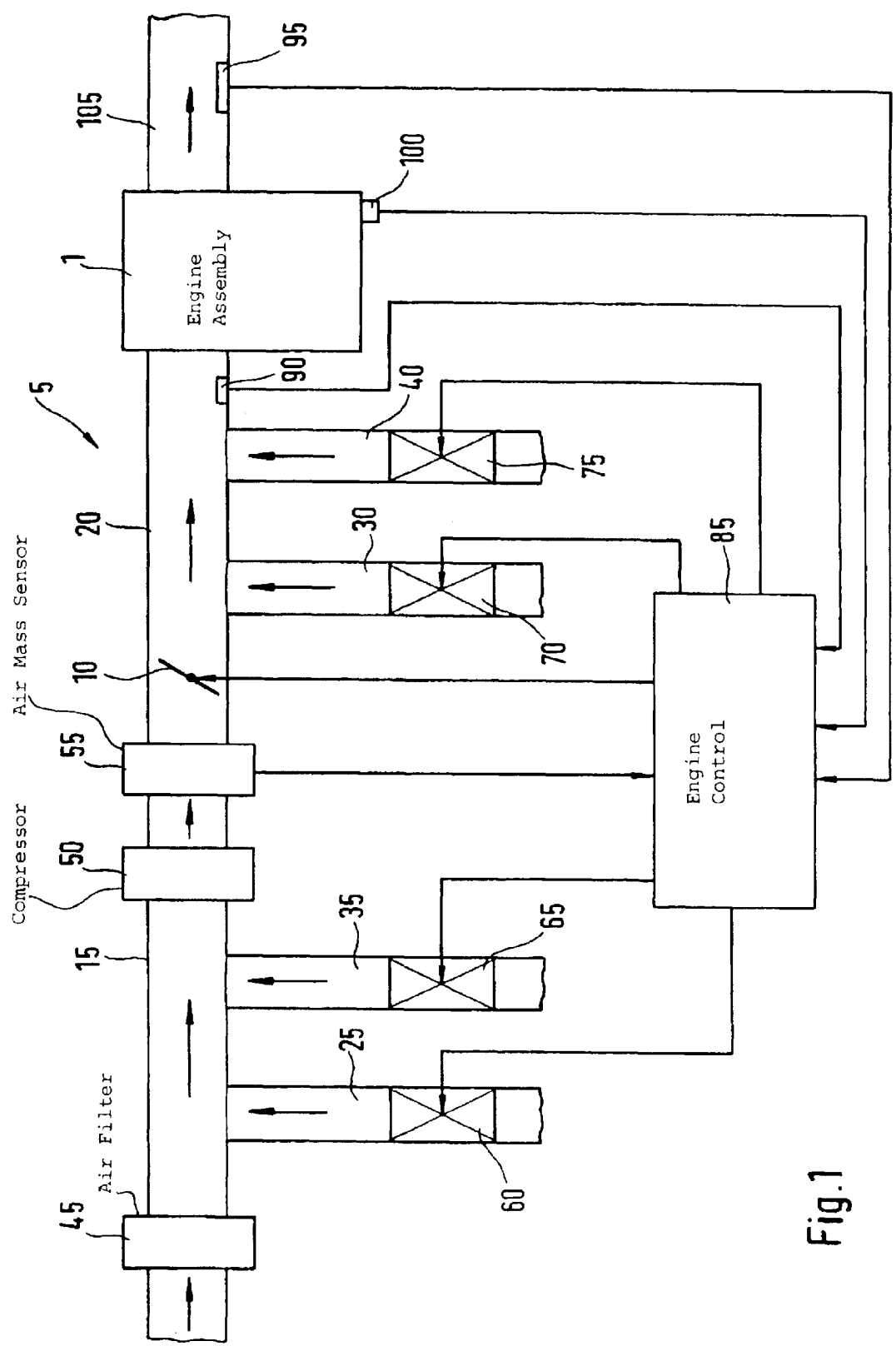
FIG. 1 is a block circuit diagram of an internal combustion engine.

In FIG. 1, reference numeral 5 identifies an internal combustion engine assembly, for example, of a motor vehicle. The engine assembly 5 includes an internal combustion engine 1 which is here configured as a spark-ignition engine by way of example. Fresh air is supplied via a fresh air supply 15 to the engine 1 in the direction of the arrows shown. The fresh air in the air supply 15 in flow direction first passes an air filter 45. A compressor 50 can be optionally mounted downstream of the air filter 45 in flow direction in the air supply 15. The compressor 50 is, for example, the compressor of an exhaust-gas turbocharger or a compressor or an electrically-operated compressor which compresses the supplied air in the activated state of the compressor 50. As shown in FIG. 1, an air mass sensor 55 can be optionally mounted downstream of the compressor 50 in flow direction. The air mass sensor 55 is, for example, a hot-film air mass sensor. An actuating member 10, for example, a throttle flap is mounted downstream of the hot-film air mass sensor in flow direction.

In the following, it is assumed that the actuating member 10 is a throttle flap. The region of the air supply 15 between the throttle flap 10 and an inlet valve (not shown) of the engine 1 is identified in the following as intake manifold 20. As shown in FIG. 1, an intake manifold pressure sensor 90 can be optionally mounted in the intake manifold 20. The injection of fuel is not shown in FIG. 1 and can take place directly into the combustion chamber (not shown in FIG. 1) of the internal combustion engine 1 in the case of gasoline-direct injection or can take place indirectly via the intake manifold 20. The exhaust gas, which occurs because of the combustion of the air/fuel mixture in the combustion chamber of the engine 1, is supplied to the exhaust-gas system 105 via an outlet valve (not shown in FIG. 1). In the exhaust-gas system 105, a lambda probe 95 can be optionally mounted which measures the oxygen content of the exhaust gas.

Spark-ignition engines can include a crankcase-venting system wherein the crankcase venting gasses are supplied to the engine 1 again for combustion. Optionally, a tank-venting system can also be provided with which the tank-venting gasses are supplied to the engine 1 again for combustion.

According to the embodiment of FIG. 1, a tank-venting system as well as a crankcase-venting system are provided. Alternatively, only one of the two venting systems, that is, either the crankcase-venting system or the tank-venting system can be provided. Here, a part-load and a full-load venting are distinguished. The full-load venting is supplied to the air filter 45 in flow direction downstream of the air supply 15. The full-load venting is supplied to the air supply 15 between the air filter 45 and the throttle flap 10. When utilizing the air mass sensor 55, the supply of the full-load venting takes place between the air filter 45 and the air mass sensor 55. In the case of the use of a compressor 50, and as shown in FIG. 1, the full-load venting is supplied to the air supply 15 between the air filter 45 and the compressor 50. The full-load venting includes a first crankcase venting 25 and a first tank venting 35.

The first crankcase venting 25 can be varied with respect to its mass flow via a first valve 60 having an adjustable degree of opening. The first tank venting 35 can be varied with respect to its mass flow via a second valve 65 having an adjustable degree of opening. The supply of the full-load venting between the air filter 45 and the throttle flap 10, and especially between the air filter 45 and the compressor 50, makes possible a utilization of a slight underpressure compared to the ambient pressure in this section of the air supply 15 at full load, especially for an activated compressor 50. The part-load venting is supplied to the intake manifold 20. According to the example of FIG. 1, the part-load venting includes a second crankcase venting 30 and a second tank venting 40. The second crankcase venting 30 can be varied with respect to its mass flow via a third valve 70 having an adjustable degree of opening. The second tank venting 40 can be varied with respect to its mass flow via a fourth valve 75 having an adjustable degree of opening. The supply of the part-load venting to the intake manifold 20 is based on the consideration that, at a part load in the intake manifold 20, an underpressure is present compared to the ambient pressure. In contrast, at full load, either ambient pressure is present in the intake manifold 20 or, especially when utilizing the compressor 50 in its activated state, an overpressure is present compared to the ambient pressure.

According to FIG. 1, an rpm sensor 100 is mounted at the engine 1 and determines an actual value for the engine rpm of the engine 1, for example, from the revolution of the crankshaft (not shown) of the engine 1. The actual value for the engine rpm is supplied from the rpm sensor 100 to an engine control 85. Furthermore, the measurement signal of the intake manifold pressure sensor 90 and therefore a measured value for the intake manifold pressure is supplied to the engine control 85. Furthermore, a measurement signal of the air mass sensor 55 and therefore a measurement value for the air mass, which is supplied to the engine 1, or the supplied air mass flow can be supplied to the engine control 85. Furthermore, the engine control 85 separately controls the degree of opening of the valves (60, 65, 70, 75) as shown in FIG. 1. The engine control 85 furthermore controls the degree of opening or, more specifically, the position of the throttle flap 10. Furthermore, the engine control 85 controls the metering of fuel and the ignition time point of the internal combustion engine 1 in a manner not shown. The engine 1 is here a spark-ignition engine by way of example.

A defect of the crankcase-venting system and/or of the tank-venting system leads, on the one hand, to an escape of toxic HC emissions into the ambient and, on the other hand, to a changed operating point of the engine 1, especially, in the idle state because of leakage air. With respect to the changed operating point of the engine 1, a leakage in the full-load venting is uncritical when utilizing the air mass sensor 55 because the additional fresh air supply, which is caused by the leakage, is measured by the air mass sensor 55. In the case of a lambda control, which is implemented in the engine control 85, for tracking a lambda actual value to a pregiven lambda desired value, the engine control 85 can then determine the required fuel quantity, which is to be injected, from the air mass flow measured by the air mass sensor 55 in order to achieve the pregiven lambda desired value. The lambda actual value is determined from the measured value of the lambda probe 95. For the case that no air mass sensor is used or the measuring result of the air mass sensor 55 is not evaluated, the load of the engine 1 (that is, the charge of the combustion chamber of the engine 1) is determined from the measured value of the intake manifold pressure sensor 90. Here, the measured intake manifold pressure considers a leakage in the full-load venting as well as also a leakage in the part-load venting. In this way, the correct value for the fuel mass, which is to be injected, is determined in the engine control 85 in order to adjust the pregiven lambda desired value when utilizing the intake manifold pressure sensor 90 to determine the load state of the engine notwithstanding a leak in the full-load venting and/or in the part-load venting from the charge derived from the measured intake manifold pressure.

For the case that the intake manifold pressure sensor 90 is not used or its measured value is not evaluated and the air mass, which is supplied to the combustion chamber of the engine 1, is determined via the air mass sensor 55, this leads, for a leak in the part-load venting, to the situation that the air, which is supplied to the combustion chamber of the engine 1 via the leakage, can not be measured by the air mass sensor 55 and therefore a defective metering of the fuel mass, which is to be injected, takes place because the fuel metering takes place primarily on the basis of the air mass determined by the air mass sensor 55. In this case, on the one hand, a deviation results between the ratio of the air mass, which is measured by the air mass sensor 55, and the injected fuel mass and, on the other hand, the ratio of the combusted air/fuel mixture which is detected by the lambda probe 95. With the aid of this deviation, a leakage in the part-load venting is diagnosed.

In the embodiment described here, a leakage of the full-load venting is to be understood hereinafter as a leakage in the air supply 15 in flow direction ahead of the air mass sensor 55 and, in the absence of the air mass sensor, ahead of the throttle flap 10 in the first crankcase venting 25 in flow direction after the first valve 60 and/or in the first tank venting 35 in flow direction after the second valve 65. The flow directions are here identified by arrows in FIG. 1.

In this embodiment, a leakage of the part-load venting is to be hereinafter understood to be a leakage in the intake manifold 20, in the second crankcase venting 30 in flow direction after the third valve 70 and/or a leakage in the second tank venting 40 in flow direction after the fourth valve 75.

With the method of the invention, a diagnosis is made possible which reliably detects leakages in the part-load venting without it being necessary to use the air mass sensor 55. A leakage, in the embodiment described here, is also understood to be, for example, a hose which has dropped off in one of the crankcase ventings 30 or in a tank venting 40. In the following, the part-load venting is considered by way of example for describing the method of the invention. The part-load venting is described for an operating state of the engine 1 wherein an idle charge control is active. This can be any desired operating state of the engine 1, especially an idle state. The idle charge control has the task of causing the actual value of the engine rpm to track the desired value. The throttle flap 10 serves as an actuating member. The drive and the degree of opening or the position of the throttle flap 10 are formed in the engine control 85. In the case of a defective performance of the part-load venting because of, for example, a leak in the intake manifold 20 in the second crankcase venting 30 in flow direction after the third valve 70 and/or in the second tank venting 40 in flow direction after the fourth valve 75, the throttle flap 10 must be closed farther in the idle operating state in order to control the desired value of the engine rpm. An index for the leak is therewith the actuating quantity or the degree of opening for the throttle flap 10 generated in the engine control. The larger the leak, the smaller is the degree of opening of the throttle flap 10 because the necessary combustion air is supplied bypassing the throttle flap 10 via the leak to the engine 1.

For the control of the throttle flap 10, adaptations are known which execute fine adaptations to the particular vehicle or to the particular engine 1. Here, one distinguishes between short-time and long-time adaptations. With the short-time adaptation, the position of the throttle flap 10 is to be adapted relatively rapidly to the particular instantaneous operating state and thereby aid the idle charge controller to a better stability.

With the long-time adaptation, a position of the throttle flap 10 for compensating longer-term influence quantities is to be adapted onto the position of the throttle flap 10. For stable ambient conditions, the long-time adaptation should carry out a long-time adaptation of the idle charge controller with a view to the control of the position of the throttle flap 10. Such stable ambient conditions are present when: the engine temperature and the intake air temperature lie in a pregiven region; in the case of the use of a climate control system, a torque request of the climate control does not exceed pregiven value; and, in the case of the use of a power steering, the power steering is not at the stop. The long-time influence quantities on the position of the throttle flap 10 can, for example, be caused by a coking of the throttle flap 10 and be a long-term change of the engine load in the idle operating state of the engine 1. Stated otherwise, the long-time adaptation functions to compensate for scatterings between the engine 1 and the drive of the throttle flap 10 and to compensate for the influence of the dirtying of the throttle flap 10 which arises during the running time of the engine.

In the following, the sequence of the method of the invention is described by way of example with respect to the flowchart of FIG. 2. After the start of the program, the engine control 85 checks at program point 200 whether the long-time adaptation was enabled in the instantaneous operating cycle of the engine and, in the event this engine drives a motor vehicle, in the instantaneous driving cycle of the motor vehicle. For the enablement of the long-time adaptation, stable ambient conditions are required as described. As described, this includes that: the engine temperature and the intake air temperature each lie in a pregiven range; a torque requested from a climate control system which may be present is not exceeded; and, a power steering system, which may be present, is not at a stop. Furthermore, an enablement of the long-time adaptation can be coupled to the following: that no raising of the desired value of the engine rpm was activated; that the short-time adaptation is enabled; that, in the case of a motor vehicle, a driving stage is set and no defective measurement signal is present for the vehicle speed; that a pregiven delay time after the start of the engine 1 has elapsed; and, that an adaptation integrator for the short-time adaptation is not limited to a maximum value. If the engine control 85 determines at program point 200 that the above-mentioned conditions for the enablement of the long-time adaptation are all fulfilled, then the program branches to program point 205; otherwise the program branches to program point 220.

At program point 205, the engine control 85 checks, for example, by means of a measurement signal of an ambient pressure sensor (not shown in FIG. 1) as to whether the engine 1 is operated at an elevation above sea level which does not exceed a pregiven elevation. If this is the case, then the program branches to program point 210; otherwise the program branches to program point 220. Exceeding the pregiven elevation can lead to a falsification of the short-time adaptation.

At program point 210, the engine control 85 checks whether no brake pumping is present. If this is the case, then the program branches to program point 215; otherwise, the program branches to program point 220. The brake pumping is detected by the engine control 85 when actuating a brake pedal in the case of a motor vehicle. In this case, the brake booster pumps air into the intake manifold so that the short-time adaptation would be falsified. For the case that such a brake pumping in the engine 1 is not possible, then program point 210 is not necessary.

At program point 215, the engine control 85 adapts an adaptation minimum base value $ad\_g\_min\_1$. With this adaptation, the smallest occurring value of the adaptation integrator, which is used in the short-time adaptation, less an elevation-dependent initialization value $h\_ad\_iw$ is stored as adaptation minimum base value $ad\_g\_min\_1$. This adaptation minimum base value $ad\_g\_min\_1$ is a representative value for the long-time behavior since long-term load changes of the engine 1 and ambient influences (for example, the air temperature) influence the long-time adaptation to higher values and the adaptation minimum base value $ad\_g\_min\_1$ has the corresponding growth potential. The elevation-dependent initialization value $h\_ad\_iw$ can be computed at the start of the engine 1 or, at the latest, at program point 215 ahead of the determination of the adaptation minimum base value $ad\_g\_min\_1$ in dependence upon the instantaneous elevation above sea level, for example, from an applied characteristic line.

The program branches to program point 225 after program point 215.

At program point 220, the adaptation minimum base value, which was last computed in one of the preceding operating cycles of the engine 1, is used as adaptation minimum base value $ad\_g\_min\_1$. Thereafter, the program likewise branches to program point 225.

For the case that, at program point 220, no adaptation minimum base value $ad\_g\_min\_1$ is present from a previous operating cycle (for example, because the instantaneous operating cycle is the first operating cycle after the original start of the engine 1), it can be provided that, at program point 220, no action takes place and, in lieu thereof, the program branches back to program point 200.

At program point 225, the long-time adaptation takes place in the engine control 85. Starting from a last determined long-time adaptation value $lza\_gw$ in a previous operating cycle or starting from an initial long-time adaptation value (in the event that the instantaneous operating cycle is a first operating cycle of the engine 1 after the original start), the engine control 85 checks at program point 225 whether the adaptation minimum base value ad_g_min_1 is greater than the present long-time adaptation value lza_gw by a first applicable offset. If this is the case, then the long-time adaptation value lza_gw is increased by this first applicable offset. Otherwise, the engine control 85 checks at program point 225 whether the adaptation minimum base value ad_g_min_1 is less than the present long-time adaptation value lza_gw by a second applicable offset. If this is the case, then the long-time adaptation value lzw_gw is reduced by the second applicable offset. Otherwise, the present long-time adaptation value lza_gw remains unchanged. The long-time adaptation value lza_gw can be limited to a maximum value LZA_GMAX. On the other hand, it can also be provided that the long-time adaptation value lza_gw does not become less than 0. After program point 225, the program branches to program point 230.

At program point 230, the engine control 85 checks whether, since the original start of the engine 1, at least one long-time adaptation was executed and whether a long-time adaptation value lza_gw was determined by the engine control 85 and stored. If this is the case, then the program branches to program point 235; otherwise, the program branches back to program point 225.

At program point 235, the engine control 85 checks whether the executed long-time adaptation was valid in the instantaneous operating cycle of the engine 1 and whether a corresponding long-time adaptation value lzw_gw was determined by the engine control 85 and stored. The long-time adaptation in the instantaneous operating cycle is valid if the short-time adaptation was active in the instantaneous operating state for at least a pregiven time. Accordingly, if at program point 235, a valid long-time action was determined by the engine control 85, then the program branches to program point 240; otherwise, the program branches back to program point 235.

At program point 240, the diagnostic method of the invention is started. The engine control 85 checks whether the instantaneously valid stored long-time adaptation value lzw_gw drops below a first pregiven threshold. If this is the case, then the program branches to program point 250; otherwise, the program branches to program point 245.

At program point 250, the engine control 85 detects a leakage of the part-load venting which adjusts only slowly. For such a leakage, which adjusts only slowly, only a slight difference adjusts between the adaptation minimum base value ad_g_min_1 and the long-time adaptation value lza_gw. This leads to a reduction of the long-time adaptation value lza_gw at program point 225. For a leakage which adjusts only slowly (for example, because of a porous hose in the second crankcase housing venting 30 or in the second tank venting 40 or because of a fissure in the intake manifold 20) the long-time adaptation value lza_gw is further and further reduced over time until it drops below the first pregiven threshold and the leakage, which develops slowly, can be diagnosed. After program point 250, the program likewise branches to program point 245.

At program point 245, the engine control 85 forms a difference $\Delta = lza\_gw - ad\_g\_min\_1$. Thereafter, the program branches to program point 255.

At program point 255, the engine control checks whether the difference $\Delta$ exceeds in magnitude a second pregiven threshold. If this is the case, then the program branches to program point 260; otherwise, there is a movement out of the program.

At program point 260, the engine control 85 diagnoses an abrupt leakage in the part-load venting wherein a large difference in magnitude adjusts relatively rapidly between the adaptation minimum base value ad_g_min_1 and the long-time adaptation value lza_gw above the second pregiven threshold. This can lead to a fault detection in the engine control 85 at program point 260. With such an abrupt leakage, the adaptation minimum base value ad_g_min_1 very rapidly assumes lower values than for a defect-free system. The short-term adaptation tries to compensate the error or leakage in the part-load venting much more rapidly than the long-time adaptation. For this reason, one can assume a leakage in the part-load venting when there is a very intense deviation of the adaptation minimum base value ad_g_min_1 from the long-time adaptation value lza_gw in magnitude above the second pregiven threshold.

There is a movement out of the program likewise after program point 260.

The first pregiven threshold and the second pregiven threshold can be suitably applied in order to detect early an abrupt leakage in the part-load venting or a leakage, which adjusts only slowly, in the part-load venting.

The diagnosed leakage at program point 250 or at program point 260 can be stored in a fault memory and can be made visible to the driver in a combination instrument. The fault memory can be read out by means of a service facility tester also at service facilities.

The adaptation minimum base value ad_g_min_1 defines a minimum short-time adaptation value in the described method.

The short-time adaptation and therefore also the long-time adaptation is only carried out as described when no brake pumping is present in order not to falsify the diagnosis of leakages in the part-load venting by brake pumping. As described, this applies only when brake pumping is possible, for example, by means of a brake booster. Correspondingly, and as described, the short-time adaptation and therefore also the long-time adaptation is executed only up to a pregiven elevation in order to avoid a falsification of the diagnosis of leakages of the part-load venting at higher elevations. Program point 205 for comparing the instantaneous elevation above sea level to the pregiven elevation can be dispensed with when it is determined that the influence of the elevation on the diagnostic result is inconsequential.

With the elevation-dependent initialization value h_ad_iw, a defective adaptation for a rapid change from higher to lower elevation is avoided without intermediate adaptation. The short-time adaptation value, which is determined by means of the adaptation integrator, is formed proceeding from the elevation-dependent initialization value h_ad_iw via addition of a pregiven start adaptation lead value and the instantaneously valid stored long-time adaptation value lza_gw. The sum forms the start value for the adaptation integrator of the short-time adaptation. As described, the minimum short-time adaptation value is then stored as the smallest occurring value of the adaptation integrator less the elevation-dependent initialization value h_ad_iw as adaptation minimum base value ad_g_min_1. The pregiven start adaptation lead value functions as a buffer during the warm-up phase of the engine 1 because, after the start, only a short-time adaptation is permitted downwardly, that is, to lower values. Outside of the warm-up phase, a short-time adaptation upwardly is also permissible. That short-time adaptation value is used as an actuating value for the adjustment of the throttle flap 10 which results as output of the adaptation integrator of the short-time adaptation. The lower the short-time adaptation value, the smaller is also the degree of opening of the throttle flap 10. In this way, the position of the throttle flap 10 considers the instantaneous operating state. The long-time adaptation forms the basis in the short-time adaptation in the manner described. For this reason, longer-term influence quantities on the position of the throttle flap 10 are considered in the formation of the short-time adaptation value and therefore for the drive of the throttle flap 10. With the diagnostic method of the invention, defective states based on leakages can be detected before, for example, permanent deviations of the actual value of the engine rpm from the desired value occur, for example, in an idle operating state. For the diagnosis, no additional sensor means is required. With the diagnosis, it is possible to display the fault condition of the engine 1 to the driver of a motor vehicle so that the driver can look for a service or maintenance facility. The diagnostic method of the invention can also be used as an independent control of a diagnosis of leakages carried out with the aid of air mass sensor 55 in the manner described. Finally, statutory diagnostic requirements are satisfied with the diagnostic method according to the invention.

It is understood that the foregoing description is that of the preferred embodiments of the invention and that various changes and modifications may be made thereto without departing from the spirit and scope of the invention as defined in the appended claims.

What is claimed is:

1. A method for operating an internal combustion engine including an actuating member in an air supply for adjusting an air mass to be supplied to the engine, the method comprising the steps of:

adapting a position of said actuating member to an instantaneous operating state by a short-time adaptation;

adapting a position of said actuating member by a long-time adaptation to compensate for longer term influences on said position of said actuating member;

for a long-time adaptation, forming a long-time adaptation value for said position of said actuating member in dependence upon a minimum short-time adaptation value for said position of said actuating member which was formed during the short-time adaptation; and, diagnosing a leakage in said air supply in dependence upon said long-time adaptation value.

2. The method of claim 1, comprising the further step of diagnosing said leakage when said long-time adaptation value drops below a first pregiven threshold.

3. The method of claim 1, comprising the further step of diagnosing said leakage when a difference between said long-time adaptation value and the minimum short-time adaptation value exceeds a second pregiven threshold in magnitude.

4. The method of claim 1, comprising the further step of carrying out said short-time adaptation only when no brake pumping is present.

5. The method of claim 1, comprising the further step of carrying out said short-time adaptation only to a pregiven elevation.

6. The method of claim 1, comprising the further step of only carrying out the diagnosis when, after a first start of said engine, already at least one long-time adaptation value was formed.

7. The method of claim 1, comprising the further step of only carrying out the diagnosis when, in an instantaneous operating cycle, the long-time adaptation became valid.

8. The method of claim 1, comprising the further step of determining a load of said engine via an intake manifold pressure.

9. The method of claim 1, comprising the further step of determining a load of said engine via the air mass supplied to said engine.

10. The method of claim 1, comprising the further step of diagnosing said leakage in at least one of an intake manifold, crankcase venting and a tank venting.

* * * * *